US009354960B2

(12) United States Patent
Suit

(10) Patent No.: US 9,354,960 B2
(45) Date of Patent: May 31, 2016

(54) ASSIGNING VIRTUAL MACHINES TO BUSINESS APPLICATION SERVICE GROUPS BASED ON RANKING OF THE VIRTUAL MACHINES

(75) Inventor: John M. Suit, Mount Airy, MD (US)

(73) Assignee: Red Hat, Inc., Raleigh, NC (US)

( * ) Notice: Subject to any disclaimer, the term of this patent is extended or adjusted under 35 U.S.C. 154(b) by 783 days.

(21) Appl. No.: 12/979,237

(22) Filed: Dec. 27, 2010

(65) Prior Publication Data

US 2012/0167083 A1  Jun. 28, 2012

(51) Int. Cl.
G06F 9/46 (2006.01)
G06F 9/455 (2006.01)
G06F 11/07 (2006.01)
G06F 11/34 (2006.01)

(52) U.S. Cl.
CPC .......... *G06F 11/079* (2013.01); *G06F 9/45558* (2013.01); *G06F 11/0712* (2013.01); *G06F 11/3442* (2013.01); *G06F 11/3466* (2013.01); G06F 11/3409 (2013.01); G06F 2009/45591 (2013.01); G06F 2201/81 (2013.01); G06F 2201/815 (2013.01); G06F 2201/865 (2013.01)

(58) Field of Classification Search
CPC .... G06F 9/5005; G06F 9/455; G06F 9/45558
See application file for complete search history.

(56) References Cited

U.S. PATENT DOCUMENTS

| 5,440,719 | A | 8/1995 | Hanes et al. |
|---|---|---|---|
| 6,513,059 | B1 | 1/2003 | Gupta et al. |
| 6,658,465 | B1 | 12/2003 | Touboul |
| 6,836,800 | B1 | 12/2004 | Sweet et al. |
| 6,871,223 | B2 | 3/2005 | Drees |
| 6,901,442 | B1 | 5/2005 | Schwaller et al. |
| 7,082,463 | B1 | 7/2006 | Bradley et al. |
| 7,181,769 | B1 | 2/2007 | Keanini et al. |
| 7,356,679 | B1 | 4/2008 | Le et al. |
| 7,409,719 | B2 | 8/2008 | Armstrong et al. |
| 7,546,598 | B2 | 6/2009 | Blumenthal et al. |
| 7,571,349 | B2 | 8/2009 | Levidow et al. |
| 7,600,259 | B2 | 10/2009 | Qi |
| 7,624,172 | B1 | 11/2009 | Austin-lane |
| 7,698,545 | B1 | 4/2010 | Campbell et al. |

(Continued)

FOREIGN PATENT DOCUMENTS

| WO | WO03055180 | 7/2003 |
|---|---|---|
| WO | WO2005050414 | 6/2005 |
| WO | WO2005101782 | 10/2005 |

OTHER PUBLICATIONS

Red Hat Office Action for U.S. Appl. No. 11/867,456, mailed Aug. 1, 2011.

(Continued)

*Primary Examiner* — Eric C Wai
*Assistant Examiner* — James J Lee
(74) *Attorney, Agent, or Firm* — Lowenstein Sandler LLP

(57) ABSTRACT

Virtual machine resources may be monitored for optimal allocation. One example method may include generating a list of virtual machines operating in a network and surveying the virtual machines to determine their current resource usage data. The method may also include ranking the virtual machines based on their current resource usage data to indicate available resources of the virtual machines, and assigning the virtual machines to at least one business application service group (BASG) that requires the available resources of the virtual machines.

14 Claims, 8 Drawing Sheets

(56) References Cited

U.S. PATENT DOCUMENTS

| | | |
|---|---|---|
| 7,761,917 B1 | 7/2010 | Kumar |
| 7,769,720 B2 | 8/2010 | Armington |
| 7,774,498 B1 | 8/2010 | Kraemer et al. |
| 7,793,162 B2 | 9/2010 | Mock et al. |
| 7,826,602 B1 | 11/2010 | Hunyady et al. |
| 7,877,781 B2 | 1/2011 | Lim |
| 7,886,294 B2 | 2/2011 | Dostert et al. |
| 7,890,318 B2 | 2/2011 | Castellani et al. |
| 7,949,404 B2 | 5/2011 | Hill |
| 7,953,696 B2 | 5/2011 | Davis et al. |
| 7,962,738 B2 | 6/2011 | Zimmer et al. |
| 7,975,058 B2 | 7/2011 | Okmianski et al. |
| 7,987,359 B2 | 7/2011 | Kawano et al. |
| 7,996,836 B1 | 8/2011 | McCorkendale et al. |
| 8,065,714 B2 | 11/2011 | Budko et al. |
| 8,098,658 B1 | 1/2012 | Ranganathan et al. |
| 8,102,781 B2 | 1/2012 | Smith |
| 8,127,290 B2 | 2/2012 | Suit |
| 8,145,760 B2 | 3/2012 | Dinda et al. |
| 8,156,378 B1 | 4/2012 | Suit |
| 8,161,475 B2 | 4/2012 | Araujo et al. |
| 8,185,442 B2 | 5/2012 | Vedula |
| 8,191,141 B2 | 5/2012 | Suit |
| 8,234,377 B2 | 7/2012 | Cohn |
| 8,250,182 B2 | 8/2012 | Frank et al. |
| 8,295,277 B2 | 10/2012 | Vadlakonda et al. |
| 8,336,108 B2 | 12/2012 | Suit |
| 8,356,353 B2 | 1/2013 | Futoransky et al. |
| 8,396,946 B1 | 3/2013 | Brandwine et al. |
| 8,429,748 B2 | 4/2013 | Suit |
| 8,478,878 B2 | 7/2013 | Freimuth et al. |
| 8,539,570 B2 | 9/2013 | Sharma et al. |
| 8,656,009 B2 | 2/2014 | Suit |
| 8,656,219 B2 | 2/2014 | Suit |
| 8,850,423 B2 | 9/2014 | Barkie et al. |
| 8,850,442 B2 | 9/2014 | Davis et al. |
| 9,043,785 B1 | 5/2015 | Suit |
| 2003/0014626 A1 | 1/2003 | Poeluev et al. |
| 2003/0046586 A1 | 3/2003 | Bheemarasetti et al. |
| 2003/0084329 A1 | 5/2003 | Tarquini |
| 2003/0101245 A1 | 5/2003 | Srinivasan et al. |
| 2003/0120935 A1 | 6/2003 | Teal et al. |
| 2003/0145225 A1 | 7/2003 | Bruton et al. |
| 2003/0158983 A1 | 8/2003 | Dalakuras et al. |
| 2003/0177112 A1 | 9/2003 | Gardner |
| 2003/0225876 A1 | 12/2003 | Oliver et al. |
| 2004/0122937 A1 | 6/2004 | Huang et al. |
| 2004/0133672 A1 | 7/2004 | Bhattacharya |
| 2005/0010765 A1 | 1/2005 | Swander et al. |
| 2005/0044206 A1 | 2/2005 | Johansson et al. |
| 2005/0102529 A1 | 5/2005 | Buddhikot et al. |
| 2005/0125503 A1 | 6/2005 | Iyengar et al. |
| 2005/0125520 A1 | 6/2005 | Hanson et al. |
| 2005/0240558 A1 | 10/2005 | Gil et al. |
| 2005/0240606 A1 | 10/2005 | Edelstein |
| 2005/0268298 A1 | 12/2005 | Hunt et al. |
| 2005/0289648 A1 | 12/2005 | Grobman et al. |
| 2006/0023638 A1 | 2/2006 | Monaco et al. |
| 2006/0037072 A1 | 2/2006 | Rao et al. |
| 2006/0041885 A1 | 2/2006 | Broquere et al. |
| 2006/0069768 A1 | 3/2006 | Wen et al. |
| 2006/0074833 A1 | 4/2006 | Gardner et al. |
| 2006/0123133 A1 | 6/2006 | Hrastar |
| 2006/0136720 A1 | 6/2006 | Armstrong et al. |
| 2006/0156380 A1 | 7/2006 | Gladstone et al. |
| 2006/0195715 A1 | 8/2006 | Herington |
| 2006/0230134 A1 | 10/2006 | Qian et al. |
| 2006/0271395 A1 | 11/2006 | Harris et al. |
| 2007/0011667 A1 | 1/2007 | Subbiah et al. |
| 2007/0043860 A1 | 2/2007 | Pabari |
| 2007/0058551 A1 | 3/2007 | Brusotti et al. |
| 2007/0061382 A1 | 3/2007 | Davis et al. |
| 2007/0073882 A1 | 3/2007 | Brown et al. |
| 2007/0083506 A1 | 4/2007 | Liddell |
| 2007/0118394 A1 | 5/2007 | Cahoon |
| 2007/0130566 A1 | 6/2007 | van Rietschote et al. |
| 2007/0147271 A1 | 6/2007 | Nandy et al. |
| 2007/0169121 A1 | 7/2007 | Hunt et al. |
| 2007/0180081 A1 | 8/2007 | Okmianski et al. |
| 2007/0198656 A1 | 8/2007 | Mazzaferri et al. |
| 2007/0204153 A1 | 8/2007 | Tome et al. |
| 2007/0204347 A1 | 8/2007 | Caceres et al. |
| 2007/0220121 A1 | 9/2007 | Suwarna |
| 2007/0234412 A1 | 10/2007 | Smith et al. |
| 2007/0234425 A1 | 10/2007 | Kim et al. |
| 2007/0238524 A1 | 10/2007 | Harris et al. |
| 2007/0261112 A1 | 11/2007 | Todd et al. |
| 2008/0005124 A1 | 1/2008 | Jung et al. |
| 2008/0016115 A1 | 1/2008 | Bahl et al. |
| 2008/0016570 A1 | 1/2008 | Capalik |
| 2008/0047009 A1 | 2/2008 | Overcash et al. |
| 2008/0056487 A1 | 3/2008 | Akyol et al. |
| 2008/0089338 A1 | 4/2008 | Campbell et al. |
| 2008/0126856 A1 | 5/2008 | Levidow et al. |
| 2008/0134175 A1 | 6/2008 | Fitzgerald et al. |
| 2008/0140795 A1 | 6/2008 | He et al. |
| 2008/0163210 A1 | 7/2008 | Bowman et al. |
| 2008/0184225 A1 | 7/2008 | Fitzgerald et al. |
| 2008/0256010 A1 | 10/2008 | Moran et al. |
| 2008/0263658 A1 | 10/2008 | Michael et al. |
| 2008/0270104 A1 | 10/2008 | Stratton et al. |
| 2008/0271025 A1 | 10/2008 | Gross et al. |
| 2008/0288962 A1 | 11/2008 | Greifeneder et al. |
| 2008/0320123 A1* | 12/2008 | Houlihan et al. ............ 709/224 |
| 2008/0320499 A1 | 12/2008 | Suit et al. |
| 2008/0320561 A1 | 12/2008 | Suit et al. |
| 2008/0320583 A1 | 12/2008 | Sharma et al. |
| 2008/0320592 A1 | 12/2008 | Suit et al. |
| 2009/0007270 A1 | 1/2009 | Futoransky et al. |
| 2009/0028053 A1 | 1/2009 | Kannan et al. |
| 2009/0049453 A1 | 2/2009 | Baran et al. |
| 2009/0064136 A1 | 3/2009 | Dow et al. |
| 2009/0119301 A1 | 5/2009 | Cherkasova et al. |
| 2009/0172666 A1* | 7/2009 | Yahalom et al. ................ 718/1 |
| 2009/0182880 A1 | 7/2009 | Inamdar |
| 2009/0182928 A1 | 7/2009 | Becker et al. |
| 2009/0183173 A1 | 7/2009 | Becker et al. |
| 2009/0204701 A1 | 8/2009 | Herzog et al. |
| 2009/0210427 A1 | 8/2009 | Eidler et al. |
| 2009/0216816 A1 | 8/2009 | Basler et al. |
| 2009/0228579 A1 | 9/2009 | Sanghvi et al. |
| 2009/0228589 A1 | 9/2009 | Korupolu |
| 2009/0254993 A1 | 10/2009 | Leone |
| 2009/0293022 A1 | 11/2009 | Fries |
| 2009/0307689 A1 | 12/2009 | Sudhakar |
| 2009/0307772 A1 | 12/2009 | Markham et al. |
| 2010/0011200 A1 | 1/2010 | Rosenan |
| 2010/0017801 A1 | 1/2010 | Kundapur |
| 2010/0031258 A1 | 2/2010 | Takano et al. |
| 2010/0049731 A1 | 2/2010 | Vedula |
| 2010/0077078 A1 | 3/2010 | Suit et al. |
| 2010/0110932 A1 | 5/2010 | Doran et al. |
| 2010/0138390 A1 | 6/2010 | Lobo |
| 2010/0146503 A1* | 6/2010 | Tsai et al. .................... 718/1 |
| 2010/0161604 A1 | 6/2010 | Mintz et al. |
| 2010/0205304 A1 | 8/2010 | Chaturvedi et al. |
| 2010/0269109 A1* | 10/2010 | Cartales ............... G06F 9/5072 718/1 |
| 2010/0281482 A1 | 11/2010 | Pike et al. |
| 2010/0287263 A1 | 11/2010 | Liu et al. |
| 2010/0293544 A1* | 11/2010 | Wilson ................. G06F 9/4401 718/1 |
| 2010/0318609 A1 | 12/2010 | Lahiri et al. |
| 2010/0332432 A1 | 12/2010 | Hirsch |
| 2011/0113467 A1 | 5/2011 | Agarwal et al. |
| 2011/0126198 A1 | 5/2011 | Vilke et al. |
| 2011/0209140 A1 | 8/2011 | Scheidel et al. |
| 2011/0225277 A1* | 9/2011 | Freimuth et al. .............. 709/223 |
| 2011/0231839 A1 | 9/2011 | Bennett et al. |
| 2011/0289204 A1 | 11/2011 | Hansson et al. |
| 2012/0054346 A1 | 3/2012 | Lee et al. |
| 2012/0072968 A1 | 3/2012 | Wysopal et al. |
| 2012/0096065 A1 | 4/2012 | Suit |
| 2012/0096134 A1 | 4/2012 | Suit |

(56) References Cited

U.S. PATENT DOCUMENTS

| | | | |
|---|---|---|---|
| 2012/0096142 | A1 | 4/2012 | Suit |
| 2012/0096143 | A1 | 4/2012 | Suit |
| 2012/0096171 | A1 | 4/2012 | Suit |
| 2012/0136989 | A1 | 5/2012 | Ferris et al. |
| 2012/0167214 | A1 | 6/2012 | Suit |
| 2012/0185913 | A1 | 7/2012 | Martinez et al. |
| 2012/0221898 | A1 | 8/2012 | Suit |
| 2013/0055341 | A1 | 2/2013 | Cooper et al. |
| 2013/0060839 | A1 | 3/2013 | Biljon et al. |
| 2013/0091496 | A1 | 4/2013 | Barsness et al. |
| 2013/0143522 | A1 | 6/2013 | Rege et al. |
| 2013/0275975 | A1 | 10/2013 | Masuda et al. |
| 2014/0109083 | A1 | 4/2014 | Scheidel et al. |
| 2015/0143366 | A1 | 5/2015 | Suragi Math et al. |

OTHER PUBLICATIONS

Red Hat Office Action for U.S. Appl. No. 11/867,456, mailed Feb. 16, 2011.
Red Hat Office Action for U.S. Appl. No. 12/111,110, mailed Mar. 17, 2011.
Red Hat Office Action for U.S. Appl. No. 12/111,110, mailed Aug. 17, 2011.
Red Hat Office Action for U.S. Appl. No. 11/867,500, mailed Dec. 23, 2010.
Red Hat Notice of Allowance for for U.S. Appl. No. 11/867,500, mailed Jun. 29, 2011.
Red Hat Office Action for U.S. Appl. No. 12/013,304, mailed Apr. 13, 2011.
Red Hat Office Action for U.S. Appl. No. 12/013,314, mailed Jul. 19, 2011.
Harwood, Aaron, Parallel Virtual Machine, Oct. 22, 2003, pp. 1-5.
Office Action for U.S. Appl. No. 11/867,456, mailed Feb. 16, 2011.
Office Action for U.S. Appl. No. 11/867,500, mailed Dec. 23, 2010.
Red Hat Notice of Allowance for U.S. Appl. No. 12/626,872, mailed May 30, 2012.
Janiquec, "Virtual Server 2005 R2 Common Issues and Tps—Duplicate MAC Addresses," Nov. 29, 2007, pp. 1-2, online link:msvirt.wordpress.com/2007/11/29/virtual-server-2005-r2-common-issues-and-tips-duplicate-mac-addresses/.
Gao et al., "A Fast and Generic Hybrid Simulation Approach Using C Virtual Machine," ACM 978-1-50503-826-8/07/0009 Cases '07, Sep. 30, 2007.
Magnusson et al., "Simics: A Full System Simulation Platform," 0018-9162.02, IEEE 2002.
Red Hat Office Action for U.S. Appl. No. 11/767,173, mailed Jul. 6, 2010.
Red Hat Office Action for U.S. Appl. No. 11/767,173, mailed Dec. 14, 2010.
Red Hat Notice of Allowance for U.S. Appl. No. 11/767,173, mailed Nov. 7, 2011.
Red Hat Office Action for U.S. Appl. No. 12/111,110, mailed Jan. 18, 2012.
Red Hat Notice of Allowance for U.S. Appl. No. 11/867,500, mailed Oct. 14, 2011.
Red Hat Office Action for U.S. Appl. No. 12/626,872, mailed Jan. 13, 2012.
Red Hat Office Action for U.S. Appl. No. 12/013,304, mailed Oct. 4, 2011.
Red Hat Office Action for U.S. Appl. No. 12/013,314, mailed Mar. 7, 2012.
Red Hat Notice of Allowance for U.S. Appl. No. 11/867,500, mailed Jun. 29, 2011.
Red Hat Notice of Allowance for U.S. Appl. No. 11/867,456, mailed Jul. 16, 2012.
Red Hat Office Action for U.S. Appl. No. 121626,872, mailed May 30, 2012.
Red Hat Office Action for U.S. Appl. No. 11/867,456, mailed Jan. 19, 2012.
Chen et al., "Design and Implementation of a Large-Scale Context Fusion Network," Proceedings of the First Annual International Conference on Mobile and Ubiquitous Systems: Networking and Services (MobiQuitous '04).
Red Hat Office Action for U.S. Appl. No. 12/111,110, mailed Jun. 11, 2012.
Red Hat Office Action for U.S. Appl. No. 13/408,980, mailed Feb. 25, 2013.
Red Hat Notice of Allowance for U.S. Appl. No. 13/408,980, mailed Jun. 12, 2013.
Red Hat Notice of Allowance for U.S. Appl. No. 12/111,110, mailed Jan. 31, 2013.
Red Hat Notice of Allowance for U.S. Appl. No. 12/626,872, mailed Dec. 20, 2012.
Red Hat Office Action for U.S. Appl. No. 12/626,872, mailed May 30, 2012.
Red Hat Office Action for U.S. Appl. No. 12/013,314, mailed Sep. 9, 2013.
Red Hat Office Action for U.S. Appl. No. 12/013,304, mailed Jul. 25, 2013.
Red Hat Office Action for U.S. Appl. No. 11/867,456, mailed Feb. 19, 2012.
Red Hat Office Action for U.S. Appl. No. 12/905,688, mailed Sep. 11, 2013.
Red Hat Office Action for U.S. Appl. No. 12/905,850, mailed Sep. 29, 2014.
Red Hat Office Action for U.S. Appl. No. 12/905,850, mailed Jun. 3, 2015.
Red Hat Office Action for U.S. Appl. No. 12/979,245, mailed Jan. 8, 2013.
Red Hat Office Action for U.S. Appl. No. 12/979,245, mailed May 24, 2013.
Red Hat Office Action for U.S. Appl. No. 12/979,245, mailed Jul. 22, 2015.
Red Hat Office Action for U.S. Appl. No. 12/979,255, mailed Dec. 27, 2012.
Red Hat Office Action for U.S. Appl. No. 12/979,255, mailed May 3, 2013.
Red Hat Office Action for U.S. Appl. No. 12/979,255, mailed Jul. 7, 2015.
Red Hat Office Action for U.S. Appl. No. 12/979,222, mailed Dec. 27, 2012.
Red Hat Office Action for U.S. Appl. No. 12/979,222, mailed Jul. 2, 2013.
Red Hat Office Action for U.S. Appl. No. 12/979,229, mailed Apr. 4, 2013.
Red Hat Office Action for U.S. Appl. No. 12/979,229, mailed Jul. 12, 2013.
Red Hat Office Action for U.S. Appl. No. 12/979,259, mailed Jun. 5, 2013.
Red Hat Office Action for U.S. Appl. No. 12/979,259, mailed Nov. 6, 2013.
Red Hat Office Action for U.S. Appl. No. 12/979,259, mailed Jul. 3, 2014.
Red Hat Office Action for U.S. Appl. No. 12/979,259, mailed Nov. 13, 2014.
Red Hat Office Action for U.S. Appl. No. 12/979,259, mailed Mar. 12, 2015.
Red Hat Office Action for U.S. Appl. No. 12/979,259, mailed Jul. 23, 2015.
Red Hat Office Action for U.S. Appl. No. 12/905,645, mailed May 6, 2015.

* cited by examiner

| BASG Profile | Threshold Data Input | Service Tier Threshold Metric (Required for VM Candidate) |
|---|---|---|
| High Capacity | CPU & Memory | CPU: 15%-39%  Memory: 5%-34% |
| High Availability | Uptime | 99.5%-100% |
| High Speed | Network Device | 80%-100% |
| Moderate Capacity | CPU & Memory | CPU: 40%-60%  Memory: 35%-60% |
| Moderate Availability | Uptime | 99%-99.5% |
| Moderate Speed | Network Device | 65-79% |
| Low Capacity | CPU & Memory | CPU: 61%-90%  Memory: 61%-90% |
| Low Availability | Uptime | 98%-99% |
| Low Speed | Network Device | 30%-64% |

*Those Virtual Machines with less than or above the metrics are considered Not Viable for candidate consideration for pairing.

ASSIGNING VIRTUAL MACHINES TO BUSINESS APPLICATION SERVICE GROUPS BASED ON RANKING OF THE VIRTUAL MACHINES

CROSS REFERENCE TO RELATED APPLICATIONS

This application is related to applications: U.S. patent application Ser. No. 11/767,173, filed on 06/22/2007, titled "Method and system for cloaked observation and remediation of software attacks," now issued U.S. Pat No. 8,191,141; U.S. patent application Ser No. 11/867,456, filed on 10/04/2007, titled "Method and system for collaboration involving enterprise nodes," now issued U.S. Pat. No. 8,336,108; and U.S. patent application Ser. No. 12/626,872, filed on 11/27/2009, titled "Network traffic analysis using a dynamically updating ontological network description," now issued U.S. Pat. No. 8,429,748.

This application is further related to the Applicant's applications:

U.S. patent application Ser. No. 12/905,565, filed on 10/15/2010 titled " Identification of business process application service groups," now issued U.S. Pat. No. 8,825,838.

U.S. patent application Ser. No. 12/905,645, filed on 10/15/2010 titled "System and method for migration of network entities to a cloud infrastructure."

U.S. patent application Ser. No. 12/905,688, filed on 10/15/2010 titled " Monitoring system performance changes based on configuration modification,"now issued U.S. Pat. No. 8,938,489.

U.S. patent application Ser. No. 12/905,761, filed on 10/15/2010 titled "Indicating an impact to of a change in state of a node", now issued U.S. Pat. No. 8,656,009.

U.S. patent application Ser. No. 12/905,850, filed on 10/15/2010 titled "System and method for enterprise nodes that are contained within a public cloud to communicate with private enterprise infrastructure dependencies."

U.S. patent application Ser. No. 12/905,879, filed on 10/15/2010 titled "System and method for determination of the root cause of an overall failure of a business application service, " now issued U.S. Pat. No. 8,156,378.

U.S. patent application Ser. No. 12/979,229, filed on 12/27/2010 titled "Automatic Determination of Required Resource Allocation of Virtual Machines."

U.S. patent application Ser. No. 12/979,245, filed on 12/27/2010 titled "Automatic Baselining of Business Application Service Groups Comprised of Virtual Machines."

U.S. patent application Ser. No. 12/979,222, filed on 12/27/2010 titled "Performing Dependency Analysis on Nodes of a Business Application Service Group."

U.S. patent application Ser. No. 12/979,259, filed on 12/27/2010 titled "Automatic Simulation of Virtual Machine Performance."

U.S. patent application Ser. No. 12/979,255, filed on 12/27/2010 titled "Performing Predictive Modeling of Virtual Machine Relationships."

The entire contents of each of the above mentioned applications are specifically incorporated herein by reference in their entireties.

TECHNICAL FIELD

Embodiments of the invention relate to analyzing network traffic analysis and, in particular, to performing automatic determining of service groups within a communications network.

BACKGROUND

Traditionally enterprises are comprised of various nodes that contribute to an overall business process. An enterprise may be thought of as a geographically dispersed network under the jurisdiction of one organization. It often includes several different types of networks and computer systems from different vendors.

These network nodes that are part of the enterprise may be comprised of both physical and virtual machines. Enterprise networks that include a plurality of virtual machines may require a physical host, which is required to allocate resources among the virtual machines.

Groups of network nodes included in the enterprise may form business process application service groups (BASGs). The "components" of these groups are comprised of virtual machines, hosts, storage devices and network devices. Each of these components may be dependent on one another. Generally, enterprise environments are not designed to pair virtual machines with hosts, storage devices, and network BASGs. As a result the virtual machines are not fully optimal and available resources may be underutilized.

BRIEF DESCRIPTION OF THE DRAWINGS

Features of the invention are more fully disclosed in the following detailed description of the invention, reference being had to the accompanying drawings described in detail below.

FIG. 3B illustrates an example table of BASG profile information and related input data and corresponding threshold metric values for the virtual machine candidates, according to example embodiments of the present invention.

DETAILED DESCRIPTION

Figure 1:
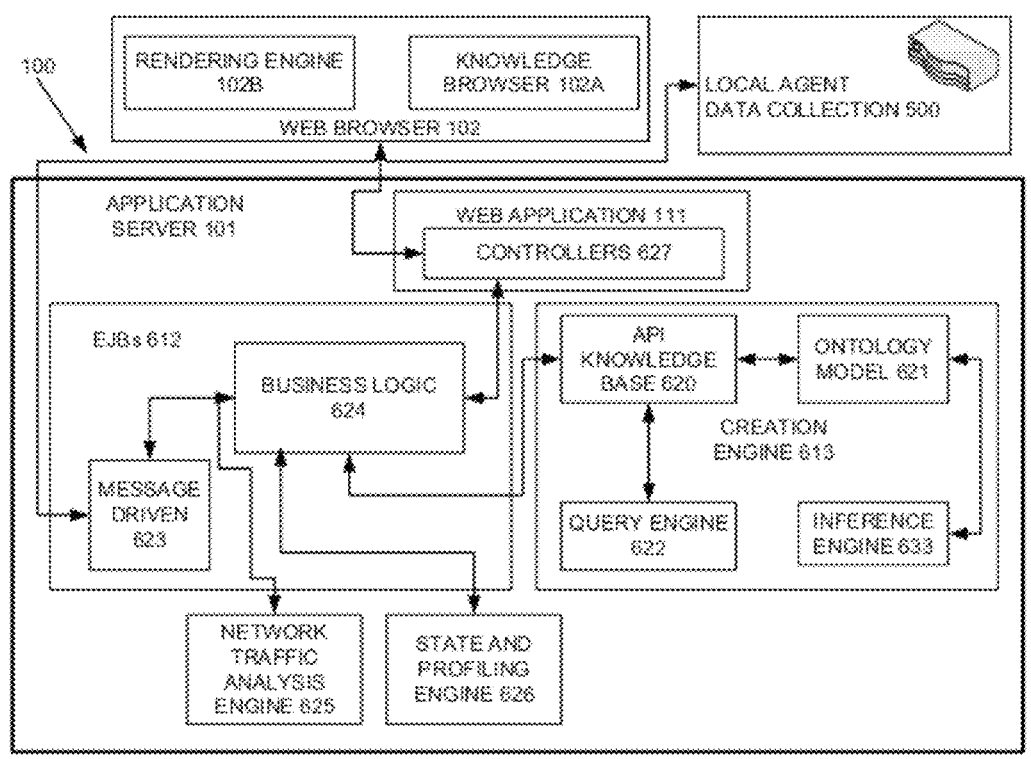
FIG. 1 illustrates an example embodiment of a system for creating and updating an ontological description of a network.

Example embodiments of the present invention may include a method of assigning virtual machines operating in a network. The method may include generating a list of the virtual machines currently operating in the network, surveying the virtual machines to determine their current resource usage data and ranking the virtual machines based on their current resource usage data to indicate available resources of the virtual machines. The method may also include assigning the virtual machines to at least one business application service group (BASG) that requires the available resources of the virtual machines.

Another example embodiment of the present invention may include an apparatus configured to assign virtual machines operating in a network. The apparatus may include a memory to store a list of the virtual machines currently operating in the network. The apparatus may also include a processor to generate the list of the virtual machines currently operating in the network, store the list in the memory, survey the virtual machines to determine their current resource usage data, rank the virtual machines based on their current resource usage data to indicate available resources of the virtual machines, and assign the virtual machines to at least one business application service group (BASG) that requires the available resources of the virtual machines.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Specific example embodiments of the present invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms.

FIG. 1 illustrates an example logic diagram of a system 100 configured to deploy data collection agents onto network nodes, according to example embodiments of the present invention. Referring to FIG. 1 an application server 101 interfaces with a web browser 102 and a local agent data collection network element 500. Certain operations may be performed by the system 100, such as, monitoring network connections instantiated at each network node, acquiring resulting data, automatically creating an ontological description of the network from the acquired data, dynamically updating the ontological description, etc.

According to an example embodiment, elements of system 100 may utilize the Java® software platform and Enterprise Java Bean® (EJB) architecture to provide certain functionality. These well-known terms may be used in the description that follows. Other software platforms and architectures, providing similar functionality, may be used without departing from the scope of the present invention.

System 100 may consist of an application server 101, which interacts across a network with a number of data collection agents 500. Application server 101, may be an element of an administrative console (AC) that also provides a suite of network management tools. A system administrator may perform network traffic analysis and/or other network management tasks by accessing application server 101 through a web browser 102. Application server 101 may include an EJB module 612, an ontological description creation engine 613, and a web application 111. Web browser 102 may include a rendering engine 102B and a knowledge browser 102A.

In operation, data collection agent(s) 500 may be deployed onto network nodes including physical and/or virtual machines in an enterprise information technology (IT) infrastructure environment. After such deployment, application server 101 receives messages from data collection agents 500. These messages may include data representing, for example, state and relationship information about the network nodes, configuration information related to the IT infrastructure, performance/utilization data and network communication. Thresholds are assigned to a component and/or can also be assigned to an entire business application service group (BASG). A host may provide CPU usage as a resource allocated to a virtual machine, the CPU operational usage performance is an example metric. The virtual machine and host machine are both examples of components.

The received messages may be initially handled by EJB module 612. For example, message driven EJB 623 may initially inspect a received message. A received message relating to network traffic or node status may be forwarded by message driven EJB 623 to the business logic EJB 624. Business logic EJB 624 may call network traffic analysis engine 625 for messages relating to network traffic. Alternately, "infrastructure messages" (i.e., those messages relating to node status) may be forwarded directly to the state and profiling engine 626.

Messages forwarded to the state and profiling engine 626 may undergo sorting and processing. The state and profiling engine 626, for example, may identify the entities within the IT infrastructure as well as their dependency on one another, based on messages received from the platform. In addition, state and profiling engine 626 may perform further processing to determine the state of one or more entities. State may be based on a threshold that has been defined, for example, by the system administrator. The threshold may be based on a metric that either exceeds or underperforms in a specific area of interest of the system administrator. An example threshold may be set for a server operating in the enterprise network that is exceeding a specified CPU utilization percentage, a disk utilization percentage and/or a memory utilization percentage.

A data output from state and profiling engine 626 may be sent to ontological description creation engine 613. Initially, the data may be handled by a resource description framework (RDF) application programming interface (API) knowledge base 620, where the data is categorized and stored utilizing a predefined entity relationship determined by ontology web language (OWL) API or ontology model 621.

Messages handled by the network traffic analysis engine 625 may include source-to-destination data, qualified by a communicating application within the operating system of the originating node, as well as frequency of communication information. This received data is analyzed by processing the number and type of connections to determine if an ontological "communicates_with" relationship exists. A determination may be made by tracking the number of connections of a specific application over a period of time. The period of time may be preselected, for example, by the system administrator.

Data output from network traffic analysis engine 625 may be sent to ontological description creation engine 613. Initially, the data may be handled by the RDF API knowledge base 620 where the data is categorized and stored utilizing a predefined entity relationship, determined by OWL API ontology model 621. For example, OWL API ontology model 621 may define what entity classes exist, their possible relationship to each other, and their possible state.

Figure 2:
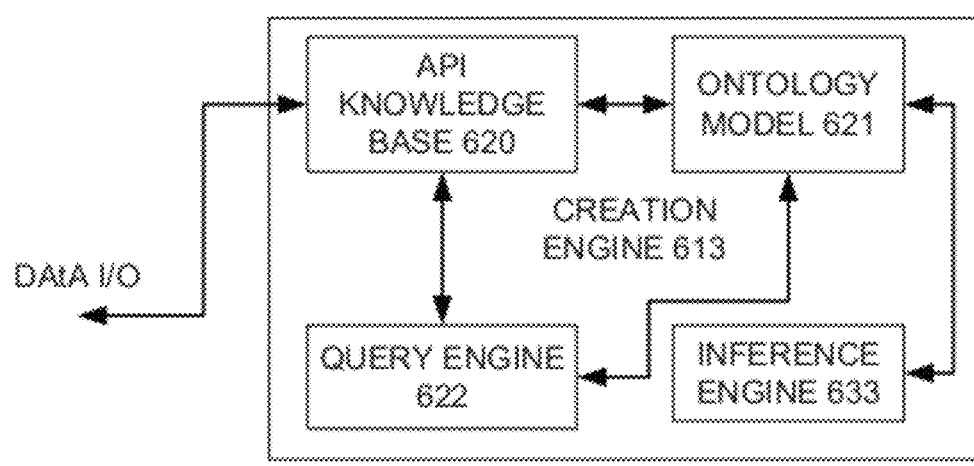
FIG. 2 illustrates a detail of ontological creation engine, according to an example embodiment.

FIG. 2 illustrates a detailed diagram of ontological description creation engine 613, according to example embodiments of the present invention. Referring to FIG. 2, as data is received by RDF API knowledge base 620, logic in the RDF API knowledge base 620 may map the incoming data to the appropriate ontological classes and relationships defined by OWL ontology API model 621. Once the correct classes and relationships are selected, the entity and relationship information may be entered into RDF API knowledge base 620. The knowledge base may also be forwarded to a SPARQL database or query engine 622 for later inference processing by inference engine 633. Inference engine 633 may determine inferred relationships based on the ontology model contained in OWL ontology API model 621.

The model and structure the system uses to create and update the knowledge base is contained within a web ontology language (OWL) file present on the application server 101. OWL is a family of knowledge representation languages for authoring ontologies which are a formal representation of the knowledge by a set of concepts within a domain and the relationships between those concepts. Ontologies are used to represent the properties of a domain, and may be used to describe the domain. The ontology provides the direct and indirect dependency information that the (SPARQL) query engine 622 requires in order to infer the impact a change in "state" will have on the rest of a service group or BASG.

In an enterprise network, a business application will typically include a primary application with one or more executables that execute on one or more nodes of the network. These nodes may have direct and indirect dependencies on other nodes of the network. The business application may be described by a network ontology. When an alert state occurs for the business application, the components of the business application ontology may be analyzed to determine what adjustments are required to achieve a steady state based on assigned thresholds. The root cause may be a direct or indirect root cause, which may then be reported to the system administrator.

According to an example embodiment, a visualization of a current network state and/or communication activity may be provided to an administrator. The system administrator may be provided with a visual rendering (e.g., on a computer monitor) of the knowledge base. The visualization may be filtered to any selected entity of interest. For example, referring again to FIG. 1, the system administrator or other user may use a web browser 102 to request rendering of data via web application 111 from controllers 627.

Controllers 627 may pass along any filtering information such as a specific Host ID. Next, business logic EJB 624 may be called by the controllers. Business logic EJB 624 may query RDF API knowledge base 620 for requested data. The requested data may be returned through controllers 627 to the web browser. The requested data may then be converted into a directed graph chart by a rendering engine.

Example embodiments of the present invention may provide the ability to automatically determine allocation adjustments that may be required for virtual machine performance, and monitoring the service tier thresholds assigned to a specified virtual machine. Thresholds are directly related to a node "state". The state may be defined as an indicator to the system and the user of a business application service, such as, whether, the business application service meets a specified threshold requirement. The process to determine the state of an individual element may be based on a threshold that has been defined, for example, by the system administrator. The threshold may include a metric that either exceeds or underperforms in a specific area of interest of the system administrator. An example would be a server in a network that is exceeding a specified CPU utilization percentage.

Example embodiments of the present invention may provide automatically detecting when a virtual machine's baseline of performance requires an allocation change from the virtual machine's host. Determining the percentage of increase or decrease in CPU usage, memory usage, storage usage, and network usage may be required in order to maintain a baseline operating in a normal range.

The system 100 may monitor for a steady state of a virtual machine by tracking service tier thresholds identified as normal. The system will provide the virtual machine's host with the changes in performance allocations needed to operate within a normal range to continue or achieve a normal range. The adjustment is expressed in terms of a percentage increase or decrease from the present allocation of resources assigned to it by its physical host.

The following terminology is used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" may also be used as a shorthand notation for "and/or".

Networks including computer entities, physical and/or virtual machines operating on network nodes, etc., may be advantageously described via an ontology that describes the operational usage and current state of the entities rather than being based on a fixed IT infrastructure architecture. The ontological description may be automatically and dynamically updated based on data acquired from data collection agents deployed to the nodes of the network. The data collection agents observe communicative relationships based on connections between nodes in operational use, while annotating a class state. Using the ontological description, a network analyst or system operator may be provided with an improved ability to analyze network traffic.

Data relating to actual connections may be acquired automatically in near real-time. For example, an actual connection may be monitored in an interrupt-driven way while collecting information regarding an application that made the connection. Moreover a "volume for the connections" may be derived. A software-based data collection agent may be received by a computing device at a node within a communications network. The agent may be distributed to one or more nodes from a central node via the network.

Once the software-based data collection agent is received, it may be inserted in an operating system of the receiving node. Advantageously, the agent may be inserted in the kernel of the operating system or in a user space (i.e., an area in virtual memory of a computer that contains user applications that execute at the application layer). The installation may be performed such that it is transparent or undetectable by a user of the node. The installed data collection agent may monitor data packet traffic between an adaptive driver layer and a protocol layer and report results of the monitoring to the central node.

In one example, the data collection agent 500 may have an interface to an operating system's network stack and may periodically determine what applications are using the network stack. As a result, the data collection agent may track information regarding a network connection, the connection duration, and any applications and systems involved in the connection. Moreover, the data collection agent 500 may normalize the foregoing information and report it to an administration console so that different operating systems may be correlated by the administration console.

As a further example, the data collection agent 500 may include a network filter inserted into the network stack to determine exactly when a connection is made between entities. The filter component of the data collection agent may be inserted at one or more layers of the OSI model. For example, a data collection agent 500 may have a filter interface at the transport layer and/or a filter interface at the network layer. The data collection agent 500 may track information regarding a network connection, the connection duration, and any applications and systems involved in the connection. Moreover, the data collection agent may normalize the foregoing information and report it to the administration console so that different operating systems may be correlated by the administration console.

As yet a further example, the data collection agent 500 described in the preceding paragraphs may also include a packet filter inserted into the network stack to track connection data. For example, a data collection agent 500 may have a filter interface at the data link layer. Then, the data collection agent 500 may correlate and normalize (if required) data from the network filter and the packet filter to track information regarding the network connection, the connection duration, any applications and systems involved in the connection, connection status and connection resource usage information. Moreover, the data collection agent 500 may normalize the foregoing information and report it to the administration console so that different operating systems may be correlated by the administration console.

Referring again to FIG. 1, an illustrative system 100 for deploying data collection agents onto network nodes, monitoring network connections instantiated at each network node, acquiring resulting data, automatically creating an ontological description of the network from the acquired data, and dynamically updating the ontological description will be described. The system 100 may further be used for monitoring configuration drifts within an enterprise network as will be described in more detail below. In an example embodiment, elements of system 100 utilize the Java software platform and Enterprise Java Bean (EJB) architecture to provide certain functionality, and these well-known terms may be used in the description that follows.

According to example embodiments of the present invention, the process to automatically determine a performance allocation may begin by monitoring those virtual machines that have sustained a service tier threshold in either a critical low and/or a critical high level for more than 24 hours. Such an observation may be observed by the virtual machine agent. The SQARQL query engine 622 simultaneously initiates a query for current performance threshold data stored in a database.

The components' states may be determined since they have thresholds that include at least one of achieved, overachieved, and/or underachieved. Nodes, executables and the business application service groups (BASGs) may also incorporate status and alerts from infrastructure providers. The executables may have a state that relates to the "communicates_with" relationship. For example, if an executable such as sqlservr.exe no longer communicates with node X, it may be designated critical high and indicated on a user interface as red or as a warning. This example may be true of a node that represents a "communicates_with" relationship as well as a primary application represented as a node.

The state and profiling engine 626 may set the state of the business application service group (BASG) using the agent data and system information. When any component of the BASG has achieved a "High Warning" state, the user may view the component as red (indicating a high warning) as well as the BASG itself being displayed in red on a graphical user interface. Various other visual indicators (e.g., shapes, sizes, shades, etc.) may be used to illustrate different operating performance levels.

The process to determine the state of an individual element may be based on a threshold that has been defined, for example, by the system administrator. The threshold may include a metric that either exceeds or underperforms in a specific area of interest to the system administrator. An example would be where a server in a network is exceeding a specified CPU utilization percentage.

Example embodiments of the present invention may automatically determine the optimum pairing of virtual machines in a business process application service group (BASG) to maximize performance as measured by a service tier threshold system. Examples may include automatically analyzing the baseline of direct and indirect connections based on network interactivity of the applications that are utilized to perform a process.

A BASG is comprised of one or more nodes operating on the enterprise network. The basis for an automatic base-lining procedure may be in the ontological structure of the categorized BASG. The resulting data file may contain a structure that includes classes, object properties, and data values. The system creates a profile type for each selected BASG host, storage device, and other network dependent components/elements. This profile may include specific attributes that are used to pair virtual machines with BASGs providing the virtual machine to execute optimally.

Example operations may provide identifying specific virtual machines to pair with a specific business BASG. One ore more virtual machines may be paired with one or more BASGs. The system may determine which BASGs are best suited for a pairing based on parameters that include high availability, high capacity, high speed, moderate capacity, moderate speed, moderate availability, low capacity, low speed, and low availability. These are considered by the system to be the BASG types. The virtual machines that require these attributes are then paired to these BASGS.

Initially, the system 100 may analyze each of the BASGs performance data to determine if any of the BASGs would benefit from a newly added virtual machine pairing. This analysis may be performed by processing the aggregate service tier thresholds of the host member(s) of the BASG. For example, by processing the state information of both the storage and network BASG dependencies, the need for additional virtual machines may be apparent based on the needs and requirements of the BASG. The storage and network state information may be factored with the host performance threshold data and state information to determine a profile of the BASG.

The BASG profile may include categories, which may include but are not limited to high availability, high capacity, high speed, moderate capacity, moderate speed, moderate availability, low capacity, low speed, and low availability. FIG. 3B illustrates an example table of a BASG profile and its corresponding threshold data input and service tier threshold metric information required for a virtual machine candidate selection process. Depending on the metrics that are measured, a virtual machine that is operating less than or above the specified metric ranges included in FIG. 3B, may not be considered a candidate for pairing with a particular BASG. The service tier thresholds may be based on the requirements of a particular BASG and its current operating baseline.

The system 100 may analyze the virtual machines to determine the optimal combination of host applications, storage required and network performance by analyzing the service tier threshold performance data acquired. Each virtual machine is assigned a profile requirement, such as, high availability, high capacity, high speed, moderate capacity, moderate speed, moderate availability, low capacity, low speed, and low availability. The system 100 pairs the virtual machine with at least one host, network, and storage group that has availability and, which may be assigned to a BASG. Or, alternatively, the BASG can produce availability by migrating one or more less optimally paired virtual machine elsewhere.

The system 100 may also provide a work order that can be processed by an orchestration system, or, individual, who is responsible for executing the changes. The system 100 routinely (as defined through the user interface) monitors the networking environment to maintain optimum virtual machine pairings with host, storage, and speed groups that include one or more BASGs.

Figure 3A:
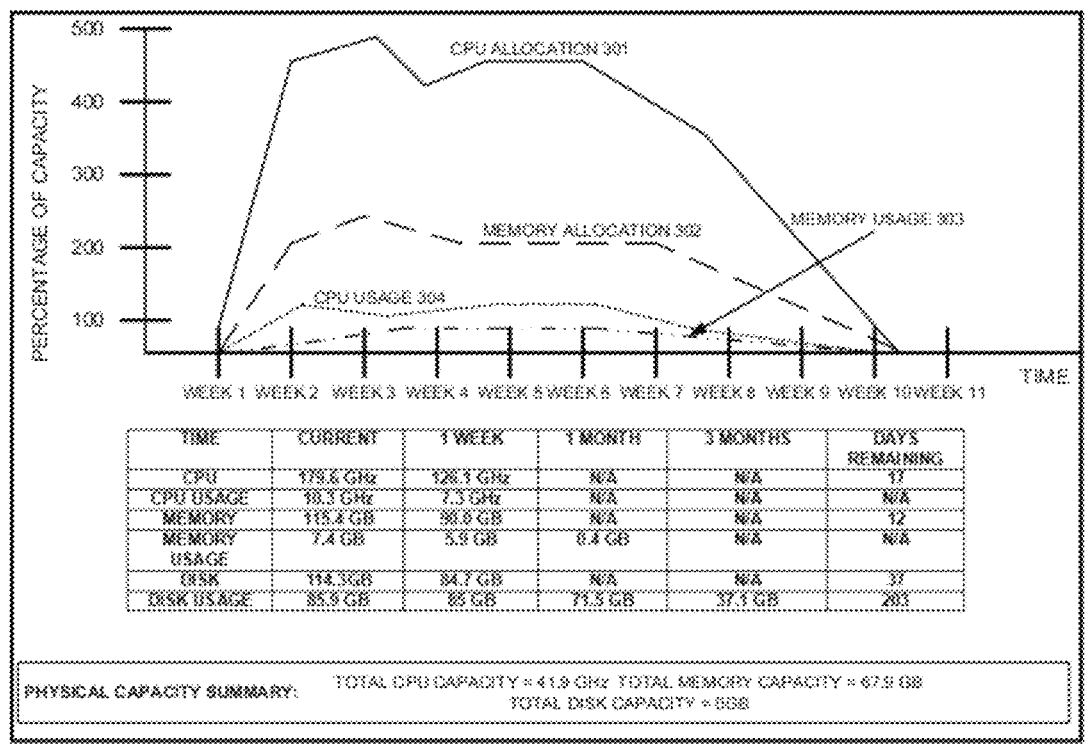
FIG. 3A illustrates an example graphical user interface to view the amount of allocated resources used over time, according to example embodiments of the present invention.

FIG. 3A illustrates an example graphical user interface (GUI) used to demonstrate resource allocation and usage over time, according to example embodiments of the present invention. Referring to FIG. 3A, a GUI for a system administrator may include a graph of percentage of capacity vs. time (weeks). For example, resources are included in the graph, including, CPU allocation 301, memory allocation 302, memory usage 303 and CPU usage 304. The performance details are illustrated in a table that includes the current baseline information, last week, last four weeks and last three months, and days remaining.

In FIG. 3A, a physical capacity summary is also provided for easy summarization of the total CPU capacity, memory capacity and disk capacity. This base-line summary provides a system administrator with a snapshot of operating conditions of the BASGs, virtual machines and overall available resources. This provides the system administrator with the information necessary to determine if the BASGs, virtual machines and available resources are being utilized efficiently throughout the network.

Figure 4:
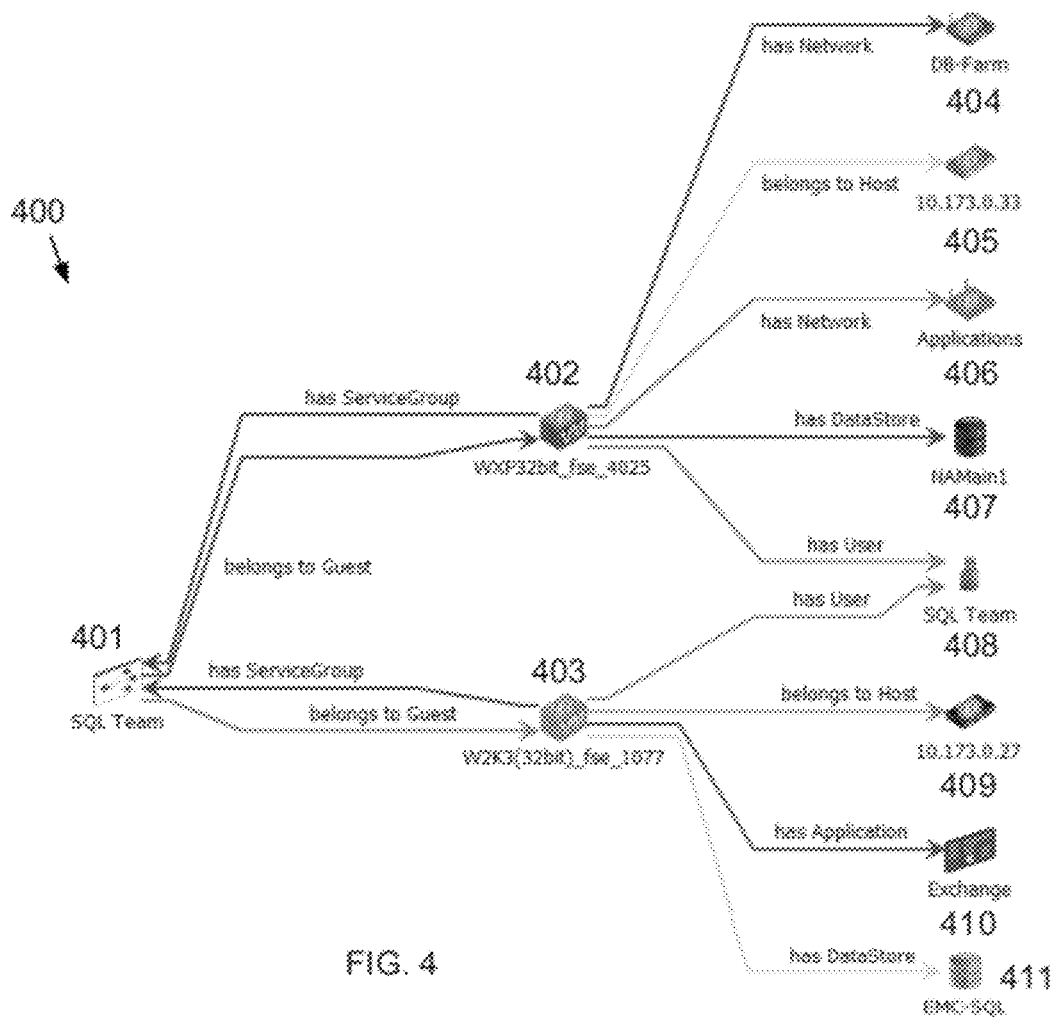
FIG. 4 illustrates a graphical user interface used to view the network hierarchy, according to example embodiments of the present invention.

FIG. 4 illustrates another example GUI according to example embodiments of the present invention. Referring to FIG. 4, a hierarchical logic flow diagram 400 includes a host device 401, which may be a SQL team of individuals assigned to a particular BASG, and two different virtual machines 402 and 403. The various network resources 404-411 are illustrated as being assigned to at least one virtual machine.

The various network resources 404-411 are illustrated as being assigned to at least one virtual machine. Resource icon 404 represents a logical network in the "enterprise" for virtual machine 402. It is associated with a device at the virtual infrastructure management level (i.e., ESX Server), which is a name for the network as it is known to the enterprise for our purposes.

Resource icon 405 is the physical host (hardware) for the virtual machine 402 along with other virtual machines, and is referred to as the hypervisor. Resource icon 406 is the network for virtual machine 402. It is the same as 404, a logical network in the "Enterprise", and is associated with a device at the virtual infrastructure management level (i.e., ESX Server), which is a name for the network as it is known to the enterprise for our purposes.

Resource icon 407 is a datastore for virtual machine 402. It represents a physical allocation of disk storage, and is associated with a hard disk storage device at the virtual infrastructure management level. Resource icon 408 is the "User" assigned to both virtual machines 402 and 403. It has been defined and assigned by this virtualization management software. Resource icon 409 is the host for virtual machine 403. The host is a physical host (hardware) that the virtual machine is running on, along with other virtual machines, and may be referred to as the hypervisor. Resource icon 410 is the primary application that is being executed on the virtual machine 403. Lastly, 411 is the datastore for the virtual machine 403. These resource icons may be dragged and dropped to reassign resources to the virtual machines, and, in turn, modify the allocations of the BASGS.

According to example embodiments of the present invention, the system 100 will automatically determine the optimum pairing of virtual machines with BASGs to maximize performance as measured by a service tier threshold monitoring system. In operation, upon initiation by the user through the web browser interface 102, the application server 101 may receive a message to survey the virtual machines for their respective CPU and memory usage over the past 30 days. The survey may be performed by the web application server 101 sending a request to the state and profiling engine 626 to compile the usage data from the database.

The state and profiling engine 626 may transmit a JMS message to the business logic 624 that compiles the database query. The business logic 624 generates an EJB based query that includes a request for CPU and memory usage data for the last 30 days. A ranking may be performed by the SPARQL query engine 622 initiating a query. An Example of the data returned by the database is described with reference to FIG. 1. This data is used to rank the virtual machines. The ranking is averaged over the range of virtual machines returned. The ranked virtual machines are then assigned a profile by the state and profiling engine 626. The profiles may include high availability, high capacity, high speed, moderate capacity, moderate speed, moderate availability, low capacity, low speed, and low availability.

The breakpoints for the profiles may match the predefine service tier thresholds assigned by the system. Once all of the virtual machines have been assigned a profile based on their usage, the state and profiling engine sends this list via a profile EJB to the RDF API knowledge base 620. Once completed the system 100 initiates the process to compile a candidate list of BASG dependencies. The virtual machines that reside in the described ontological structures are not considered for the candidate process. The BASG candidate process is initiated by the state and profiling engine 626.

The state and profiling engine 626 sends a JMS request message to the business logic 624 to compile a list of candidate hosts, networks, and storage groups that are configured within the BASGs. The request is included within a profile EJB. This results in a database query for usage data for the last 30 days from the database. The business logic sends a request to the RDF API knowledge base 620 for state data for host, network, and storage roll-up data based on 24 hour roll-ups for the last 30 days.

The state data may contain warning or errors that resulted in a "red" state for the given nodes. The usage and state information are sent back to the state and profiling engine 626, where they are used to rank and profile the BASGs. The ranked BASGs are then assigned a profile by the state and profiling engine. The BASG profiles may include high availability, high capacity, high speed, moderate capacity, moderate speed, moderate availability, low capacity, low speed, and low availability. The breakpoints for the profiles may match the service tier thresholds previously assigned by the system.

The state information for each BASG may be used to assign a profile by automatically assigning a "low" profile to any BASG that is experiencing a warning or error (red indication). The error may be based on a 20% margin of exceeding the predefined resource threshold, and may be based on a 24 hour data roll-up for a 30-day period. No virtual machines are used to rank a BASG. The virtual machine itself is ranked in the virtual machine profile process mentioned above. Once all BASGs have been profiled, the state and profiling engine 626 may use a standard matching algorithm to pair the virtual machines with BASGs. The state and profiling engine 626 generates a report that details the recommended change in virtual machine assignment to BASGs. This list may be formatted in XML to be utilized by an orchestration system to complete the changes or to be read by a user for manual adjustments.

The states of the individual business application service components may be aggregated to calculate an overall state for the BASG. Any support nodes within the BASG ontology that have achieved a high warning may be labeled under the BASG as having a high warning. If any one node with a "communicates_with" relationship achieves a high warning status it may be identified as having a high warning for its associated BASG. High errors may be identified in a similar manner. For example, in order for a node to achieve these states, the states must have been observed and processed by the state and profiling engine 626 three times within one hour. As a result, spurious errors and random faults will not lead to warnings being generated for the overall business application process.

Figure 5:
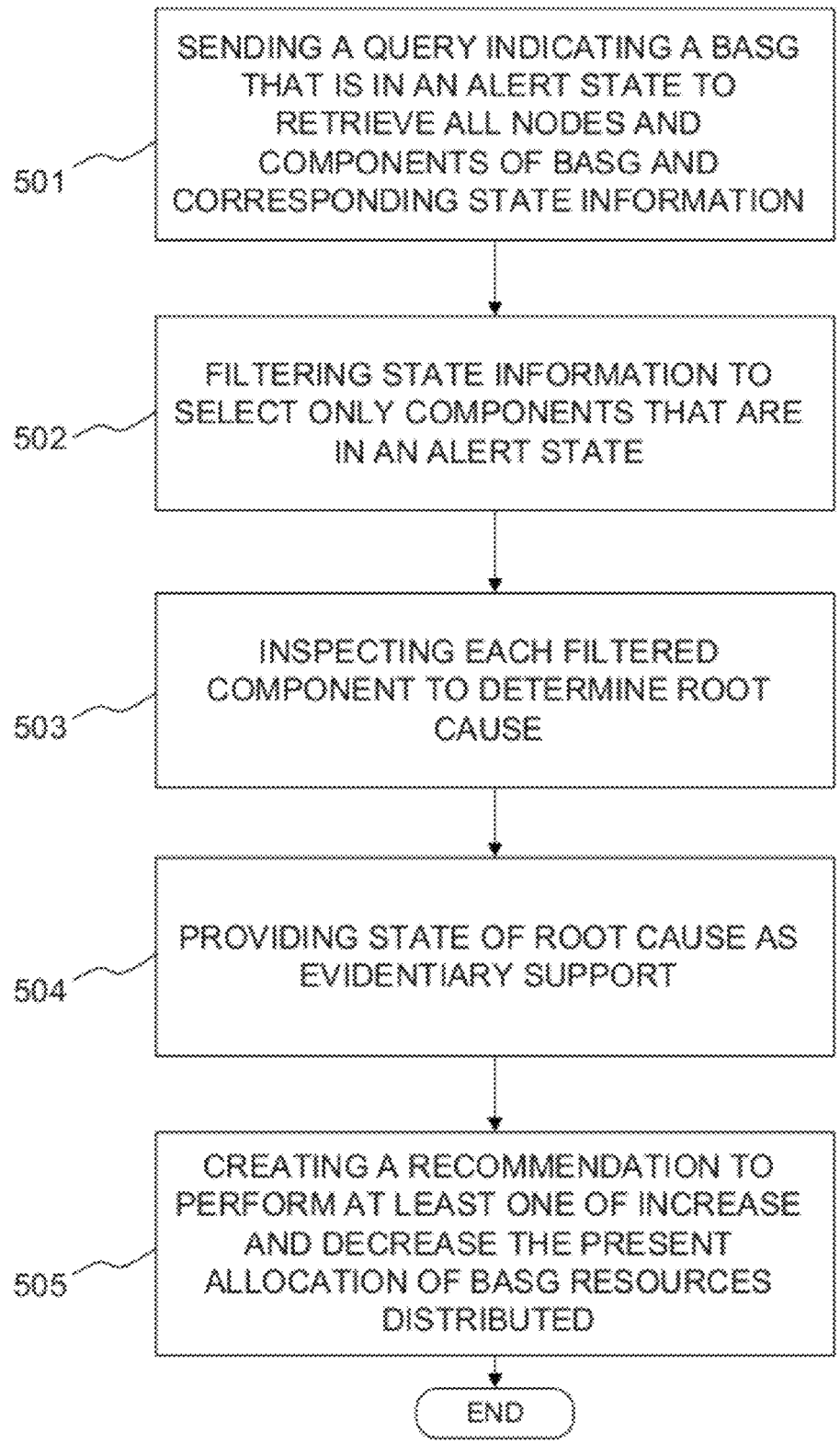
FIG. 5 illustrates an example flow diagram, according to example embodiments of the present invention.

One example method for processing state information of elements of a business process ontology and more specifically for a BASG that is in an error state will now be described with reference to FIG. 5. The method of FIG. 5 may be performed by processing logic that may comprise hardware (e.g., circuitry, dedicated logic, programmable logic, microcode, etc.), software (such as instructions run on a processing device), firmware, or a combination thereof. In one embodiment, the method is performed by a server (e.g., application server 101 of FIG. 1).

At operation 501, a query is sent to the RDF knowledgebase 620 that identifies the BASG that is currently in an error state. The RDF knowledge base 620 returns the list of components of the BASG (e.g., hardware nodes, virtual nodes, executables, processes, primary applications, etc) and their state.

It should be noted that the primary application of the BASG is considered by the RDF knowledge base to be a "node". Any of these components of the BASG may have independent thresholds assigned by the system administrator. Examples of components may include virtual machines, host machines, storage devices, network devices. Examples of resources that are allocated may include memory, CPU, storage disk space, network adapters. Examples of metrics may include a CPU utilization of 1024 Ghz, a memory utilization of 8 gigabytes, a network adapter operating at 100 Mbps, etc.

At operation 502, a filter is applied to determine those components that may have contributed to the "high warning" threshold that was exceeded and which triggered an alarm. In one example embodiment, the filter omits any individual component that has not exceeded a "high warning" threshold individually from the process. This may reduce the chances of false alarms occurring due to random instances of a predefined threshold being exceeded.

At operation 503, the process continues by inspecting each of the filtered components to determine a root cause. The inspection process looks up performance data previously reported by the agents deployed to the nodes. The inspection process may yield all of the component's relevant data for determining a root cause. In one example, the data used for this determination is service tier data, such as, CPU, memory, disk, and network operation threshold roll-up data (last 30 days), though other relevant data may also be used.

The root cause process may also use virtualization infrastructure alarms and network status updates. These are available to the system for host, virtual machines, disks, and network devices, and may be sent in messages from a proxy agent. The proxy agent may contain an instruction for translating virtual infrastructure messages to a format that the state and profile engine 626 can process. If, for example, the proxy agent receives a message from the virtual infrastructure stating a disk has achieved full capacity and has an error level of 3, the proxy agent will modify the received message with a translation on the "level of 3" to "High Error." This is then sent to the message driven bean factory 623, where an EJB is created with the contents received from the proxy agent. The business logic then routes the new state EJB to the state and profiling engine 626. This data is provided to the user as support evidence for the root cause conclusion.

The SPARQL query engine 622 determines the state of the primary applications and the contributing executables that make up the primary application by requesting the ontology for the business application service. The ontology is analyzed for breaks in communication with nodes, as described in the Applicant's co-pending applications referenced above.

The SPARQL query engine 622 will send a request to the agent to send back the performance statistics of the executables that make up the primary application of the business application service. This will provide the user with the real-time performance statistics of the executables to provide support for a conclusion that a root cause of failure is due to the failure of the primary application support nodes, at operation 504. The result of the conclusion may automatically trigger a recommendation to perform an increase and/or decrease in the present resource allocation of resources provided by a virtual machine(s), at operation 505. For example, CPU resources and disk space may be reallocated from among the network resources by the system administrator as a result or receiving the recommendation. Or, alternatively, certain reallocation measures may be performed automatically.

System 100 may comprise an application server 101, which interacts across a network with a number of data collection agents 500 deployed in various nodes of the network. Advantageously, application server 101, may be an element of an administrative console (AC) that also provides a suite of network management tools. A system administrator may perform network traffic analysis and/or other network management tasks by accessing application server 101 by way of web browser 102. Application server 101 may comprise an EJB module 612, an ontological description creation engine 613, and a web application 111.

Data collection agents 500, as described hereinabove, may be deployed onto network nodes including physical and/or virtual machines in an enterprise IT infrastructure environment. After such deployment, application server 101 receives messages from data collection agents 500. These messages may include data representing, for example, state and relationship information about the network nodes, configuration information related to the IT infrastructure, performance/utilization data and network communication.

The received messages may be initially handled by EJB module 612. For example, message driven EJB module 623 may initially inspect a received message. A received message relating to network traffic or node status may be forwarded by message driven EJB 623 to the business logic EJB 624. Business logic EJB 624 may call network traffic analysis engine 625 for messages relating to network traffic. Alternatively, "infrastructure messages" (i.e., those relating to node status) may be forwarded directly to the state and profiling engine 626.

Messages forwarded to the state and profiling engine 626 may then undergo sorting and processing. The state and profiling engine 626, for example, may identify the entities within the IT infrastructure as well as their dependency on one another, based on messages received from the platform. In addition, state and profiling engine 626 may perform further processing to determine the state of one or more entities. The states may be based on a threshold that has been defined, for example, by the system administrator. The threshold may be based on a metric that either exceeds or underperforms in a specific area of interest to the system administrator. An example would be a server operating in a network that is exceeding a specified CPU utilization percentage. The threshold may be set to 80% CPU utilization and if the server is operating at 81%, the threshold is being exceeded.

Example embodiments for determining a required resource allocation of a virtual machine based on thresholds are discussed below. The web application server business logic creates a message request to provide the necessary changes in virtual machine performance allocation variables to create a condition of no critical low and/or no critical high conditions for the next 24 hours. If the recommended change is not successful, the cycle repeats by incrementing the 24 hour period with no critical low and/or no critical high warning by the service tier threshold system. Another 24 hour monitoring period may then begin.

A recommendation of a change in a variable by a factor of 10% (increase or reduction) may be a general modification used to satisfy a threshold condition that has been exceeded/underperformed. The 10% factor modification may be used until the virtual machine exceeds a performance request, which results in the web browser 102 initiating a message to the web application 111 and controllers 627 of the virtual machine. This modification, in turn, creates a message driven entity bean that contains the request, which is transferred to a rules engine. The rules engine sends a request to gather a historical period of information to the web browser 102. Such historical information may be for a period of 1 to 90 days. The rules engine (not shown) may be part of creation engine 613 and/or EJBs 612.

The rules engine message is sent to a database (not shown) to gather the data tables requested. The database sends the data back to the rules engine. The rules engine factors the data resulting in a recommendation to increase or decrease the allocation for each of the performance threshold criteria, which may include, for example, CPU utilization, memory utilization, data storage utilization, and network resource utilization.

The resource modification recommendation is created by the creation engine, which may also be referred to as a rules engine 613. The rules engine 613 may perform averaging the actual threshold observed by the service tier threshold integer (0-100 scale). The average is taken from metrics observed while the virtual machine is observed in its normal operating range. If no normal range is observed, than the rules engine will increment the recommended change by increasing or decreasing the allocated resource(s) by 20% until a normal range is observed over a period of 24 hours. According to one example, the recommended increase or decrease is only 10% for a period following 24 hours if the data gathered does contain "normal" range input data.

A proxy agent (not shown) may be part of the local agent that is used to collect data. In operation, the proxy agent collects data from the virtual infrastructure management provider. The user will utilize the default thresholds or adjust them as deemed necessary. Thresholds are used by the state and profiling engine 626 for tracking the "state" of the nodes that make up the components for a business application process. The inventory in the database may be updated by the proxy agent with a list of virtual machines, storage, hosts, and network devices.

The agent may be deployed via the physical hosts connected directly to the virtual machine's O/S. The state and profiling engine 626 assigns the "state" of the various network components and receives additional input from the proxy agent to factor into the "state" (e.g., alarms, network, and "communicates_with" relationship status, etc.) and updates the RDF API knowledge base 620 ontologies to reflect the assignments. The agent tracks executable applications to see what other nodes are communicating with the virtual machines (VMs) in the enterprise.

The network traffic analysis engine 625 determines which executable applications and services are communicating with other nodes that constitute a "communicates_with relationship." A determination may be made as to whether any pairs of nodes have a "communicates_with relationship." Upon the assignment of a "communicates_with" relationship to the ontology of a node and its direct and indirect relationships, the state and profiling engine 626 assigns the group of nodes as a "service group."

The RDF API knowledge base 620 stores an ontology for each individual node. The model and structure the system uses to create and update the knowledge base is contained within the ontology web language (OWL) file present on the application server 101. The state and profiling engine 626 tracks the "state" continually of the components and receives additional input from the proxy agent to factor into the "state" (e.g., alarms, network, and "Communication_with" relationship status).

The user may identify a "service group" of network nodes as a business application service group (BASG) by selecting a name for the group of nodes and the executables that are the basis for the "communicates_with" relationship. The user may also add nodes that the system did not auto-detect as a component of the service group. Those added nodes will be recorded and stored in the ontology model 621.

A determination may then be made as to whether the user has assigned additional nodes and/or names to the service group. The ontology itself provides the direct and indirect dependency information of the nodes that the SPARQL query engine 622 requires to infer the impact a change in "state" will have on the rest of the service group. For instance, if a storage device's (component) state is changed to "RED" because it is almost full (e.g., only two gigabytes left of a 1500 gigabyte memory) then this may cause the physical host to start the paging memory, which will effect the performance of any and all virtual machines running on that physical host.

The SPARQL query engine 622 parses the service group ontology for the components that have a "communicates_with" relationship, which forms the basis for a primary application. The state and profiling engine 626 tracks the "state" of the BASG by requesting the current "state" from the RDF knowledge base 620 and updating the ontology when any new messages are received from the business logic EJB factory 624. The ontology itself provides the direct and indirect dependency information that the SPARQL query engine 622 requires to infer the impact a change in "state" will have on the rest of the BASG. SPARQL query engine 622 parses the BASG ontology for the components that have a "communicates_with" relationship, which forms the basis for a primary application.

For example, SPARQL query engine 622 provides a list of candidate BASG members for base-lining and adjusting what may be needed to achieve "normal" acceptable performance levels. By parsing the BASG ontology for primary applications that have "communicates_with" relationships with "virtual machines" that have operated in a "normal" level of threshold for 3 consecutive business cycles, a list of qualifying components may be produced. SPARQL query engine 622 may parse the BASG ontology to determine the components that have a "communicates_with" relationship. Such components may be used to form the basis for a primary application. SPARQL query engine 622 may generate a list of virtual machine and BASG member pairing recommendations.

Web application server 101 may receive the message to survey the virtual machines for their CPU and/or memory usage over the past 30 days. Web application server 101 may send a request to the state and profiling engine 626 to compile the usage data from the database. The state and profiling engine 626 sends a message to the business logic 624 that compiles the database query. The business logic 624 generates an entity Java Bean (EJB) based query that includes a request for CPU and memory usage data for the last 30 days.

A ranking may be performed by the SPARQL query engine 622. The ranking may be performed by sorting a list of the observed performance metrics averaged over time. The best candidate may be generated as being available on top of the generated list. The user may drag and drop the best candidate virtual machine to create a pair with the BASG. As a result of the pairing operation, the next available candidate becomes the top candidate.

The performance data is averaged over the total number of virtual machines (VMs) returned to create the ranking list. The ranked virtual machines are then assigned a profile by the state and profiling engine 626. The profiles may include high availability, high capacity, high speed, moderate capacity, moderate speed, moderate availability, low capacity, low speed, and low availability. The VMs that are operating closest to within the thresholds are ranked in order with the closest matched VM placed on top or in first position in the table of FIG. 3B. The breakpoints may be established as the points that the threshold metrics dictate the profile characteristics.

Once all of the virtual machines have been assigned a profile based on their usage, the state and profiling engine 626 sends this list via a profile EJB to the RDF API knowledge base 620. Once completed, the system 100 initiates the process to compile a candidate list of BASG dependencies, such as, CPU usage, uptime, memory usage and network device usage. The virtual machines that reside in the described ontological structures are then processed for the BASG candidate process, which may be initiated by the state and profiling engine 626.

The state and profiling engine 626 sends a JMS message to the business logic to compile a list of candidate hosts, networks, and storage groups that are configured within the presently operating BASGs. The request is contained within a profile EJB. This results in a database query being generated for usage data for the last 30 days from the database. The business logic 624 sends a request to the RDF API knowledge base 620 for state data for hosts, network, and storage roll-up data for 24 hour roll-ups for the last 30 days. The state data may contain warnings and/or errors that resulted in a "red" state for certain network nodes. The usage and state information are sent back to the state and profiling engine 626 where they are used to rank and profile the BASGs. The ranking is based on the service tier threshold performance results (see FIG. 3B).

The ranked BASGs are then assigned a profile by the state and profiling engine 626. The profiles are high availability, high capacity, high speed, moderate capacity, moderate speed, moderate availability, low capacity, low speed, and low availability. The breakpoints for the profiles match the service tier thresholds previously assigned by the system 100. The state information for each BASG is considered when assigning a profile. For example, automatically assigning a "low" profile to any BASG that has been observed to have a warning and/or error (red indication) for exceeding a service tier threshold by more than 20% based on a 24-hour data roll-up for a the time period of 30 days.

Each of the virtual machines (VMs) may be ranked in the virtual machine profile process. Once all BASGs have been profiled, the state and profiling engine 626 may use a standard matching algorithm to pair VMs with BASGs. The ranked VMs are ranked and then sorted to be paired with the hosts that contain the matching BASG types (see FIG. 3B).

The state and profiling engine 626 generates a report that details the recommended change in virtual machine assignments to BASGs. This list is formatted in XML to be utilized by an orchestration system and/or to be completed manually by a user. A determination may be made as to whether the change in allocation was successful. Regardless, the cycle of reassigning the VMs may be repeated every 30 days by default.

Figure 6:
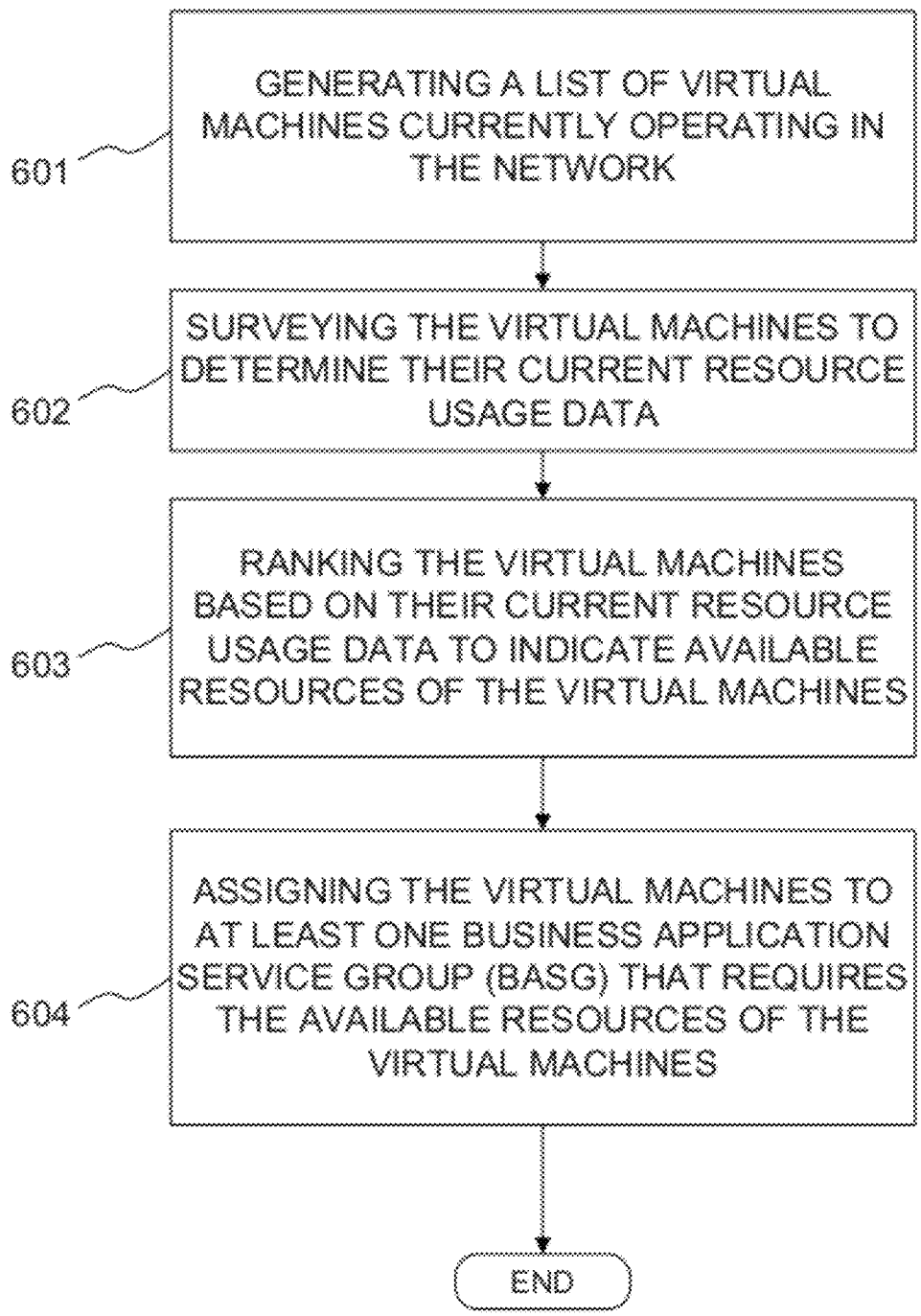
FIG. 6 illustrates another example flow diagram, according to example embodiments of the present invention.

One example method of operation may include a method of assigning virtual machines operating in a network, as illustrated in FIG. 6. The method of FIG. 6 may be performed by processing logic that may comprise hardware (e.g., circuitry, dedicated logic, programmable logic, microcode, etc.), software (such as instructions run on a processing device), firmware, or a combination thereof. In one embodiment, the method is performed by a server (e.g., application server 101 of FIG. 1).

The method may include generating a list of the virtual machines currently operating in the network, at operation 601. The method may also include surveying the virtual machines to determine their current resource usage data, at operation 602, and ranking the virtual machines based on their current resource usage data to indicate available resources of the virtual machines, at operation 603. The method may further include assigning the virtual machines to at least one business application service group (BASG) that requires the available resources of the virtual machines, at operation 604.

Figure 7:
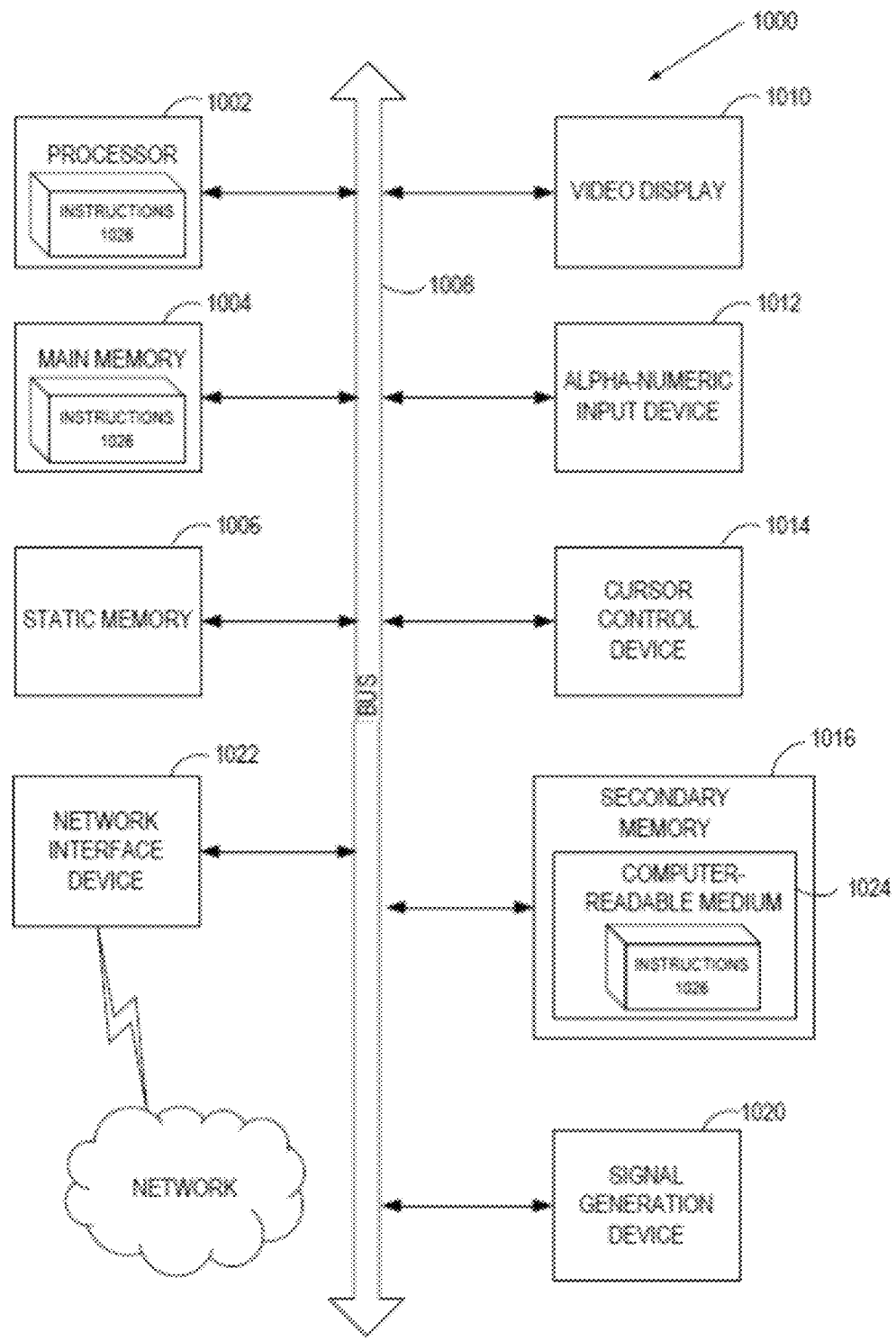
FIG. 7 is a block diagram of an exemplary computer system that may perform one or more of the operations described herein, according to example embodiments of the present invention.

FIG. 7 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1016 (e.g., a data storage device), which communicate with each other via a bus 1008.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute instructions 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The secondary memory 1016 may include a machine-readable storage medium (or more specifically a computer-readable storage medium) 1024 on which is stored one or more sets of instructions 1026 embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

The machine-readable storage medium 1024 may also be used to store software performing the operations discussed herein, and/or a software library containing methods that call this software. While the machine-readable storage medium 1024 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "encrypting", "decrypting", "sending" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method comprising:
   identifying virtual machines currently operating in a network;
   surveying the virtual machines to determine current resource usage data of the virtual machines;
   ranking, by a processing device, the virtual machines in view of the current resource usage data, wherein a rank of each virtual machine corresponds to available resources of a respective virtual machine, wherein ranking of the virtual machines comprises averaging the current resource usage data of the virtual machines over the number of virtual machines;
   assigning profiles to the virtual machines in view of the current resource usage data;
   identifying a plurality of business application service groups (BASGs) to be paired with the virtual machines based on performance data of the plurality of BASGs; and
   assigning, by the processing device, each of the virtual machines to at least one of the plurality of BASGs based on current resource requirement of the at least one BASG and one or more of a rank or a profile of the corresponding virtual machine indicating resource availability of the corresponding virtual machine.

2. The method of claim 1, wherein the profile is at least one of a high availability, high capacity, high speed, moderate capacity, moderate speed, moderate availability, low capacity, low speed and low availability, and the profile is based on at least one of CPU usage, memory usage and disk usage.

3. The method of claim 1, further comprising:
   compiling a list of candidate BASGs prior to assigning the virtual machines to the at least one business application service group (BASG).

4. The method of claim 1, wherein the virtual machines are currently operating as part of an established BASG prior to assigning the virtual machines to the at least one business application service group (BASG).

5. The method of claim 1, wherein the current resource usage data is obtained over a period of 30 days.

6. An apparatus comprising:
   a memory to store a list of virtual machines currently operating in a network; and a processor, coupled to the memory, to:
   identify virtual machines currently operating in a network;
   survey the virtual machines to determine current resource usage data of the virtual machines;
   rank the virtual machines in view of the current resource usage data, wherein a rank of each virtual machine corresponds to available resources of a respective virtual machine, wherein ranking of the virtual machines comprises averaging the current resource usage data of the virtual machines over the number of virtual machines;
   assign profiles to the virtual machines in view of the current resource usage data;
   identify a plurality of business application service groups (BASGs) to be paired with the virtual machines based on performance data of the plurality of BASGs; and
   assign each of the virtual machines to at least one of the plurality of BASGs based on current resource requirement of the at least one BASG and one or more of a rank or a profile of the corresponding virtual machine indicating resource availability of the corresponding virtual machine.

7. The apparatus of claim 6, wherein the profile is at least one of a high availability, high capacity, high speed, moderate capacity, moderate speed, moderate availability, low capacity, low speed and low availability, and the profile is based on at least one of CPU usage, memory usage and disk usage.

8. The apparatus of claim 6, wherein the processor is further configured to compile a list of candidate BASGs prior to assigning the virtual machines to the at least one business application service group (BASG).

9. The apparatus of claim 6, wherein the virtual machines are currently operating as part of an established BASG prior to assigning the virtual machines to the at least one business application service group (BASG).

10. The apparatus of claim 6, wherein the current resource usage data is obtained over a period of 30 days.

11. A non-transitory computer readable storage medium comprising instructions that when executed cause a processor to perform operations comprising:
    identifying virtual machines currently operating in a network;
    surveying the virtual machines to determine current resource usage data of the virtual machines;
    ranking, by the processor, the virtual machines in view of the current resource usage data, wherein a rank of each virtual machine corresponds to available resources of a respective virtual machine, wherein ranking the virtual machines comprises averaging the current resource usage data of the virtual machines over the number of virtual machines;

assigning profiles to the virtual machines in view of the current resource usage data;

identifying a plurality of business application service groups (BASGs) to be paired with the virtual machines based on performance data of the plurality of BASGs; and assigning each of the virtual machines to at least one of the plurality of BASGs based on current resource requirement of the at least one BASG and one or more of a rank or a profile of the corresponding virtual machine indicating resource availability of the corresponding virtual machine.

12. The non-transitory computer readable storage medium of claim 11, wherein the profile is at least one of a high availability, high capacity, high speed, moderate capacity, moderate speed, moderate availability, low capacity, low speed and low availability, and the profile is based on at least one of CPU usage, memory usage and disk usage.

13. The non-transitory computer readable storage medium of claim 11, wherein the operations further comprise:

compiling a list of candidate BASGs prior to assigning the virtual machines to the at least one business application service group (BASG).

14. The non-transitory computer readable storage medium of claim 11, wherein the virtual machines are currently operating as part of an established BASG prior to assigning the virtual machines to the at least one business application service group (BASG).

* * * * *